Patented Oct. 22, 1929

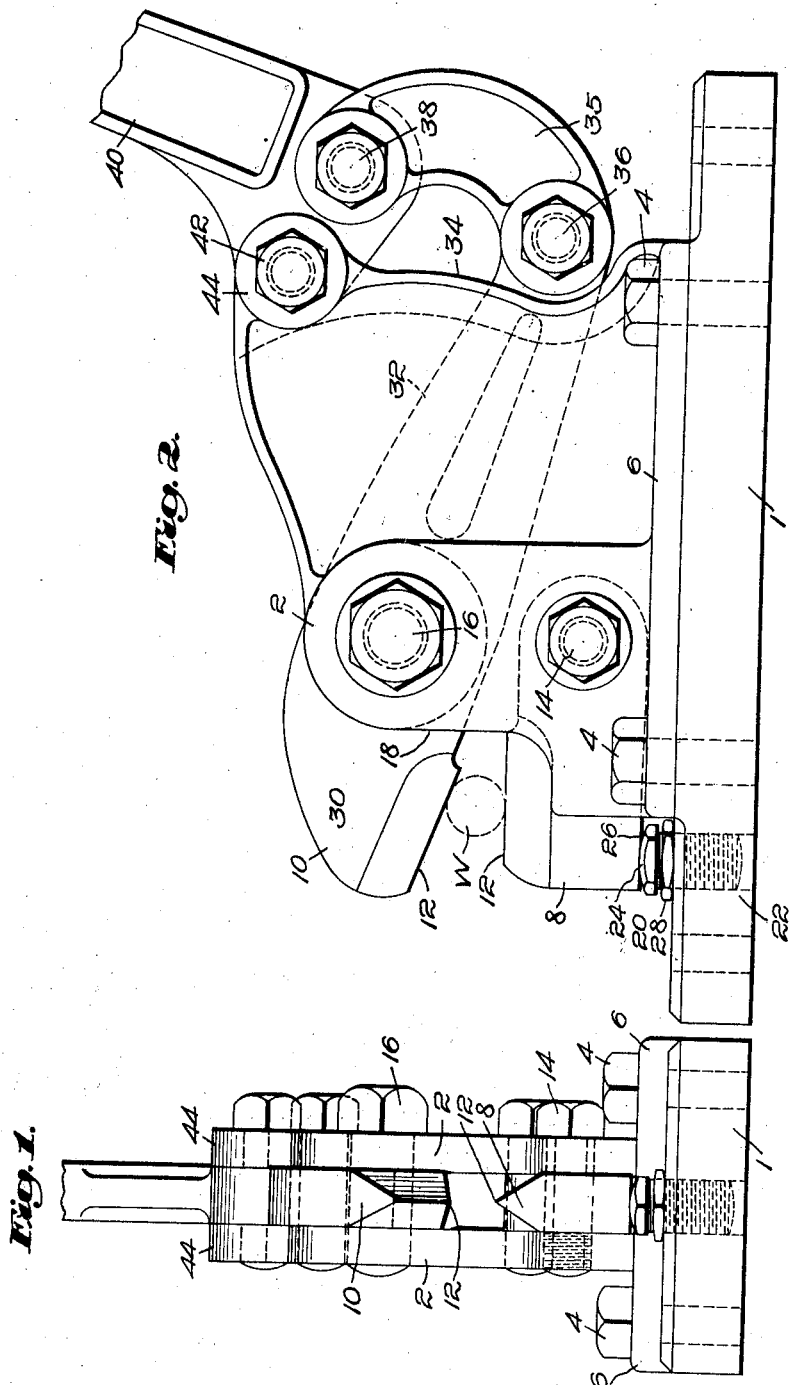

1,733,056

UNITED STATES PATENT OFFICE

JOHN J. EYRE, OF SAUGUS, MASSACHUSETTS, ASSIGNOR TO H. K. PORTER, INC., OF EVERETT, MASSACHUSETTS, A CORPORATION OF MASSACHUSETTS

CUTTING TOOL

Application filed June 9, 1927. Serial No. 197,661.

This invention aims to provide an improved metal cutting tool particularly of the bench type.

In the accompanying drawings is shown an illustrative embodiment of the invention, wherein:

Fig. 1 is a front elevation of the cutting tool, with portions of the operating handle broken away; and Fig. 2 is a side elevation of the same, parts of the operating handle being broken away as in Fig. 1 to save space in the drawings.

In the particular embodiment of the invention selected for purposes of illustration and shown in the drawings, a base 1 is provided with spaced upright members 2 of suitable design and herein separably mounted upon said base.

Screws 4 extend through lateral flanges 6 on said upright members into the base 1 thereby firmly securing the several parts of the frame together, although it is to be understood that the invention is not limited to the making of said frame in separable parts.

Arranged between the spaced frame members 2 are cooperating cutters 8 and 10 each having a cutting edge 12, herein arranged to abut one with the other for the cutting operation, either in the common plane of operation of the several operating parts, which lies approximately centrally between the members 2, or said edges may abut in symmetrical relation to said plane according to the type of cutter used, thereby insuring an equal distribution of pressure upon said members 2.

The cutters 8 and 10 are pivotally supported between the members 2, herein upon pivotal screws 14 and 16 respectively, which pass through aligning holes in said members. One of said cutters, herein the cutter 8, is relatively stationary, having pivotal movement about its stud 14 merely for the purpose of adjusting the position of its cutting edge 12 toward or away from the cutting edge of the other cutter 10 to compensate for wear or the changing of the position of said edge by grinding. The cutter 8 is furthermore pivoted at a point near one end and the cutting portion thereof projects outwardly beyond the forward edges 18 of the members 2 so as to provide clear space for the reception of the work herein shown in dotted lines at W, Fig. 2.

In the present example adjustment of the cutting edge of said stationary cutter 8 is effected by means of a screw 20 arranged in screw threaded relation with a forwardly projecting portion 22 of the base 1. The head 24 of said screw is arranged to engage the under surface 26 of said cutter 8 herein directly beneath the cutting edge 12 thereof, and a check nut 28 on said screw maintains the latter in prearranged relation and so assists in supporting the cutter against the thrust exerted upon it during cutting operations.

The cutter 10, herein the movable cutter, is pivoted intermediate its ends upon said screw 16, which is by preference arranged directly above the screw 14. The head or cutting end 30 of the cutter 10 extends forwardly from said pivot, beyond the edges 18 of said members 2, so that its cutting edge 12 will cooperate with the edge 12 of the other cutter 8. The tail end 32 of the movable cutter extends rearwardly of the pivot 16 between the supporting members 2 and protrudes slightly beyond the rear edges 34 of said frame members. Against opposite faces of the protruding portion of the tail 32 are pivotally secured two curved links 35 by means of a screw 36. The upper ends of these links are also pivotally secured by a screw 38 to an operating lever 40 which latter is pivoted upon a screw 42 supported upon opposite sides of said lever by suitable bosses 44 formed respectively upon the members 2.

The rear edges 34 of the frame members 2 are curved on an arc swung from the axis of the pivot screw 16 of said movable cutter so that the links 35 connecting the tail of said movable cutter, although close up to said side members, may be moved freely to rock said cutter 10 about its pivot without touching said side members.

In order to provide ample cutting power for the movable cutter without unnecessarily lengthening the operating handle 40 the pivot 38 for said links 35 is placed relatively close to the pivot 42 for the operating lever and said links 35 are curved as hereinbefore stated so as to permit the axes of the three pivot screws 36, 38 and 42 to move in toggle formation into substantial alignment during the latter part of the cutting operation and thereby provide maximum power at the time when such is most desirable.

By not extending the tail of the stationary cutter 8 rearwardly beyond its pivot 14, ample space will be provided for the oscillatory movements of the tail 32 of said movable cutter. This makes it possible to lower the pivot 42 of the operating lever and thereby provide a very compact and powerful cutting tool.

The invention is not limited to the particular embodiment shown.

I claim:

A cutting tool comprising a base; spaced side members superimposed on said base; a pair of cutting jaws pivotally mounted between said side members, the cutting portions of said jaws extending forwardly from their pivots beyond the front edges of said side members and provided with abutting cutting edges; operating means for at least one of said cutting jaws, said base having a portion projecting forwardly beneath the operative portions of said cutting jaws; and means adjustable in the projecting portion of said base beneath the cutting portion of the other cutting jaw directly to support the cutting edge thereof in adjustable relation with the operated cutting jaw.

In testimony whereof, I have signed my name to this specification.

JOHN J. EYRE.